May 17, 1955  M. W. COLEMAN  2,708,463
GUIDE FOR POWER DRIVEN ROTARY TOOLS
Filed Jan. 14, 1952  6 Sheets-Sheet 1
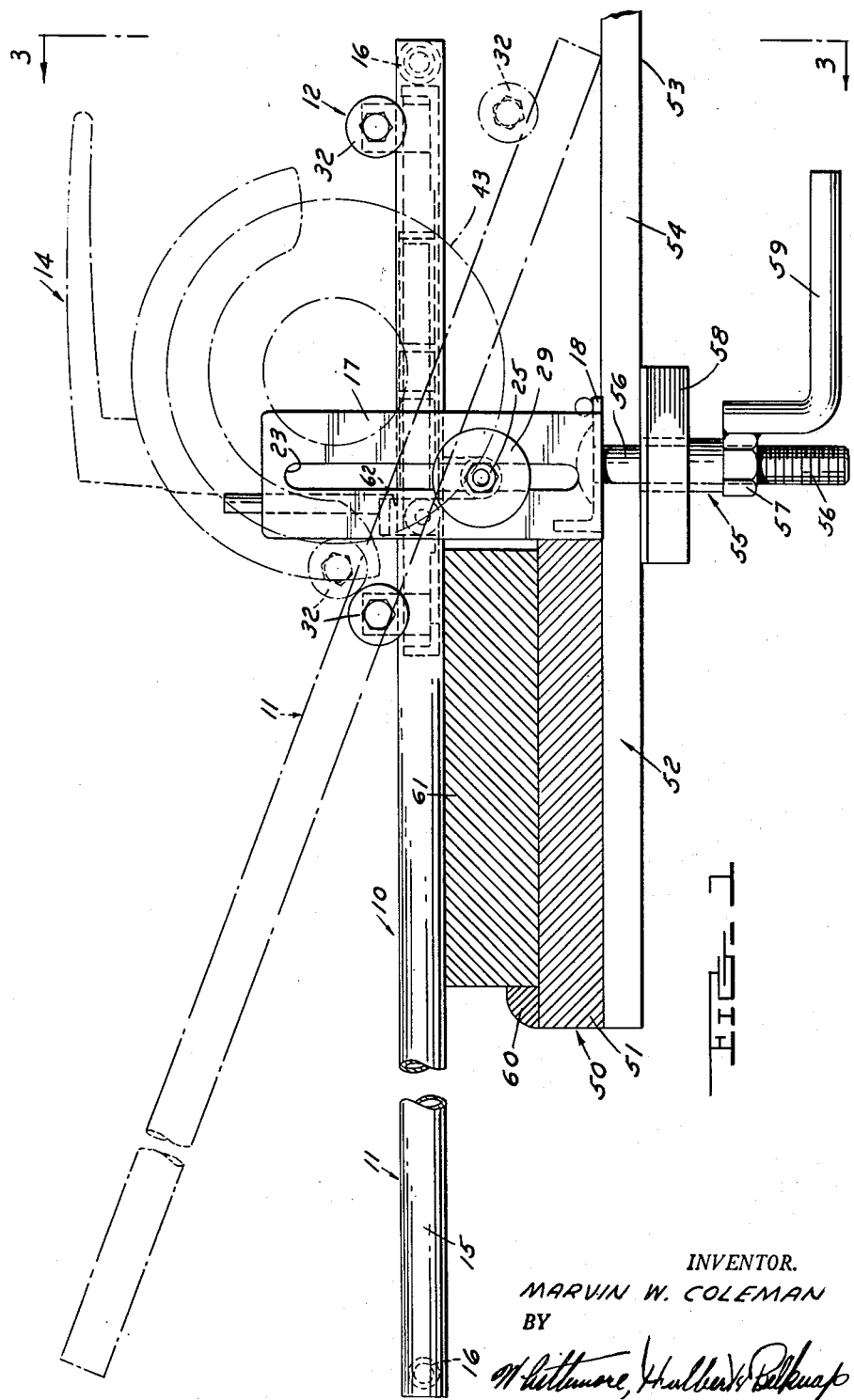
INVENTOR.
MARVIN W. COLEMAN
BY
ATTORNEYS

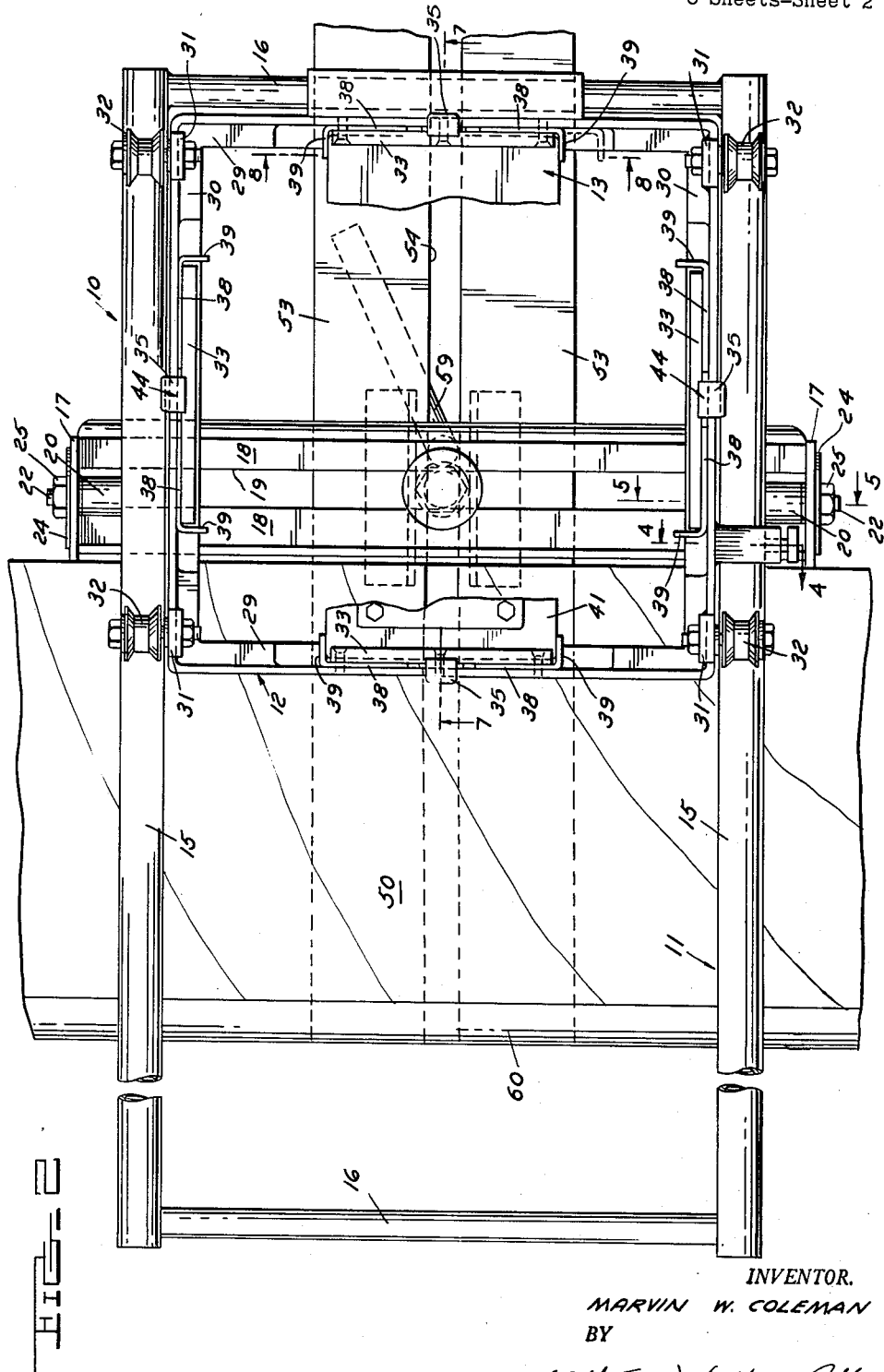

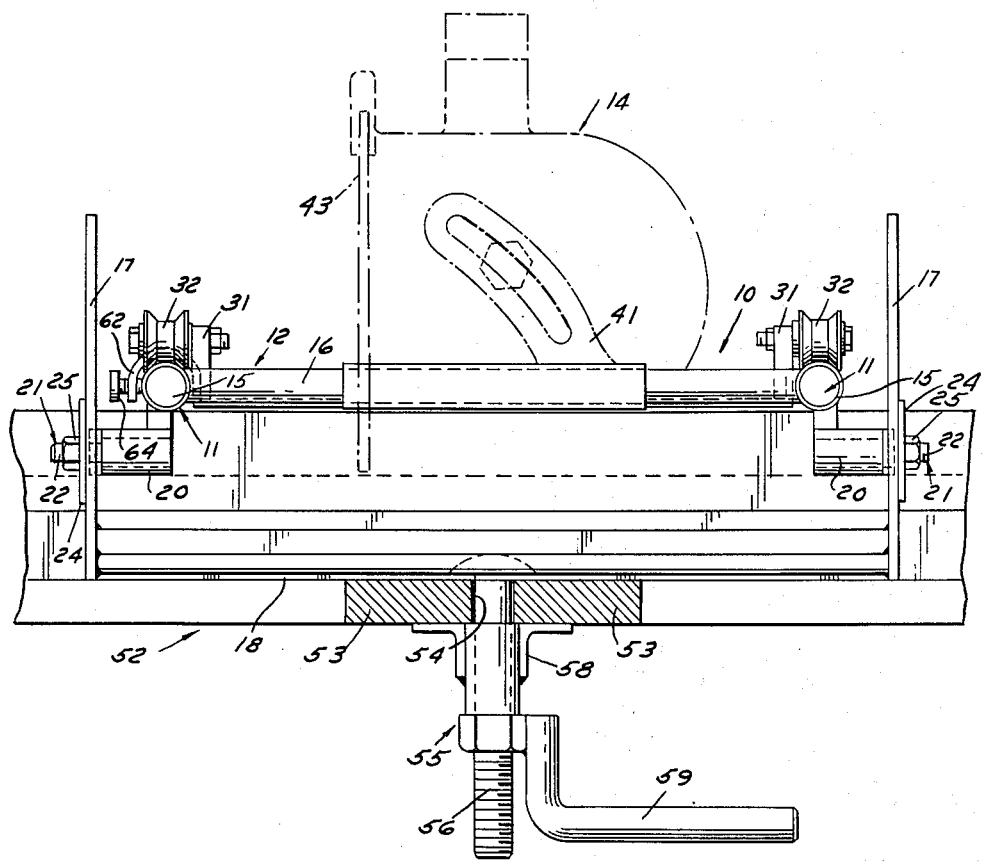

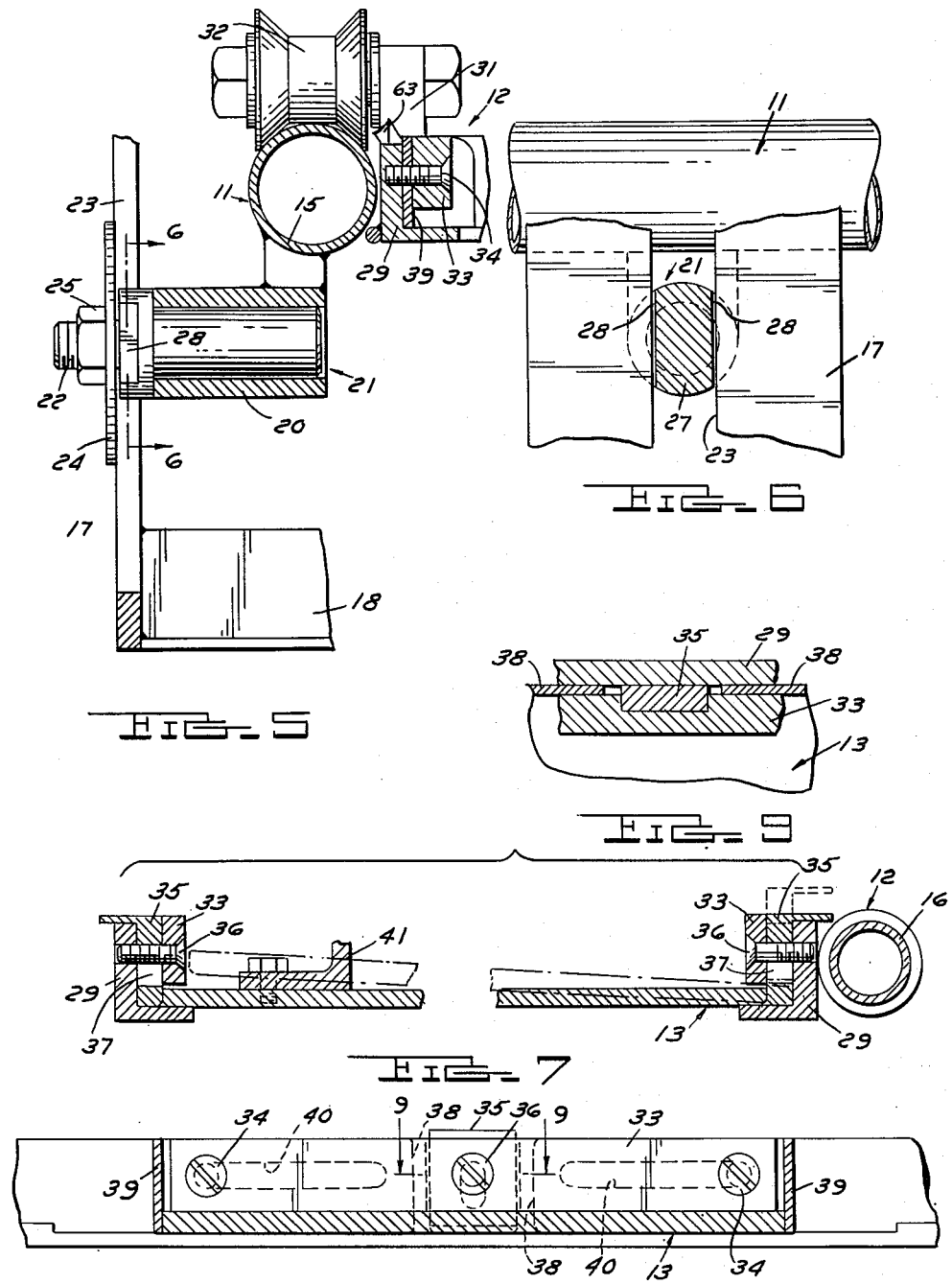

May 17, 1955
M. W. COLEMAN
2,708,463
GUIDE FOR POWER DRIVEN ROTARY TOOLS
Filed Jan. 14, 1952
6 Sheets-Sheet 5
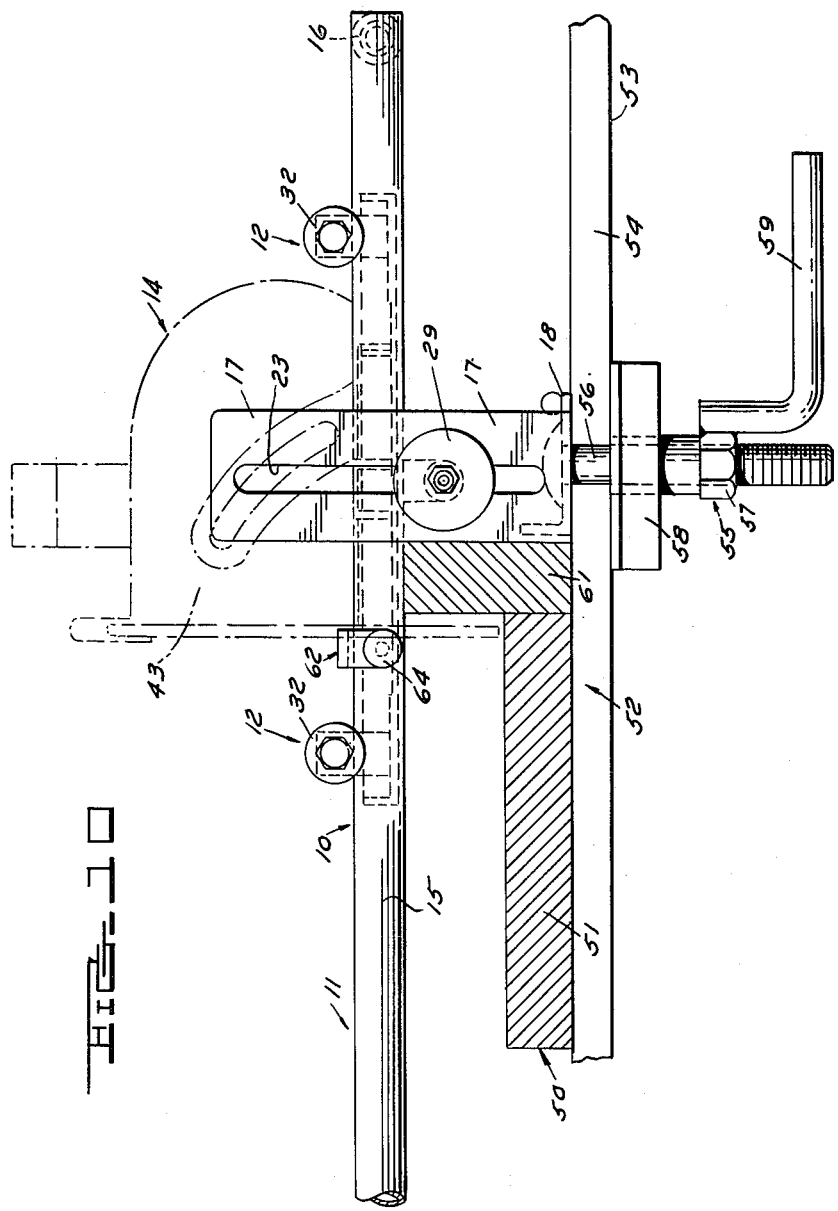
INVENTOR.
MARVIN W. COLEMAN
BY
Whittemore, Hulbert & Belknap
ATTORNEYS

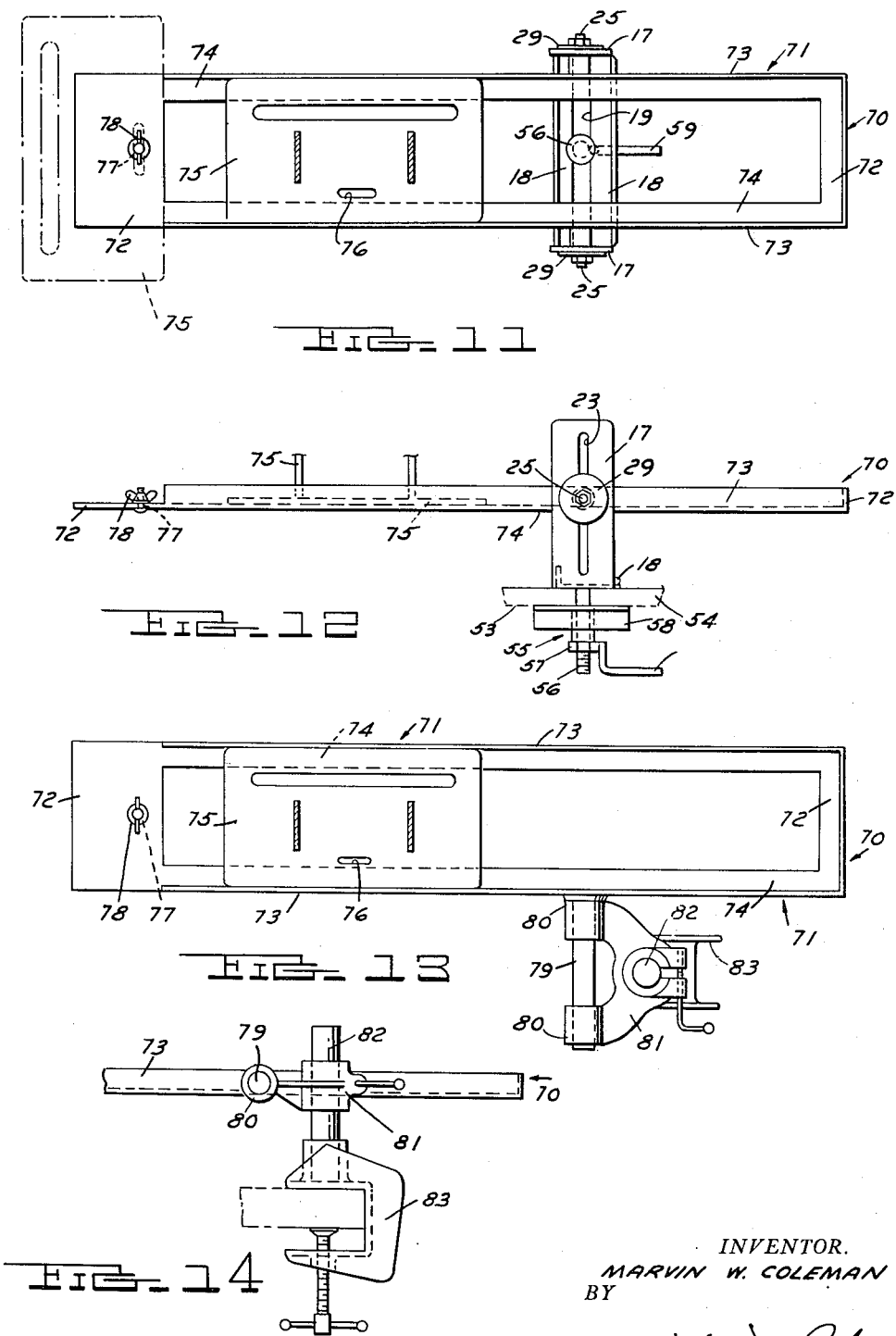

United States Patent Office 2,708,463
Patented May 17, 1955

2,708,463

GUIDE FOR POWER DRIVEN ROTARY TOOLS

Marvin W. Coleman, Dearborn, Mich.

Application January 14, 1952, Serial No. 266,263

5 Claims. (Cl. 143—6)

This invention relates generally to a guide for rotary tools, and refers more particularly to a guide attachable to a work supporting bench or table for controlling the path of movement of a tool such for example as a rotary saw relative to the work on the table or bench.

It is an object of this invention to provide a light weight guide composed of a relatively few simple parts capable of being inexpensively manufactured and easily set up for operation in a minimum length of time.

It is another object of this invention to provide a guide capable of supporting a portable power saw, for example, in the various positions most suitable to rip, cross-cut, angle cut and etc. the work supported on the bench.

It is still another object of this invention to provide a guide which accurately positions the rotary tool or saw with reference to the work to be cut, and in addition, has means enabling the position of the tool to be changed to suit widely varying conditions.

It is a further object of this invention to provide a guide having a track pivotally supported intermediate the ends for vertical swinging movement and having a tool supporting carriage movable along the track from one side of the pivot axis to the other. This arrangement renders it possible to use the weight of the tool to clamp the work on the bench during the sawing or cutting action, and hence greatly simplifies the operation of the saw or tool.

The foregoing as well as other objects will be made more apparent as this description proceeds, especially when considered in connection with the accompanying drawings, wherein:

Figure 1 is a side elevational view partly in section of a rotary tool guide embodying the features of this invention;

Figure 2 is a plan view of the construction shown in Figure 1;

Figure 3 is a sectional view taken substantially on the line 3—3 of Figure 1;

Figure 4 is a sectional view taken on the line 4—4 of Figure 2;

Figure 5 is a sectional view taken on the line 5—5 of Figure 2;

Figure 6 is a sectional view taken on the line 6—6 of Figure 5;

Figure 7 is a sectional view taken on the line 7—7 of Figure 2;

Figure 8 is a sectional view taken on the line 8—8 of Figure 2;

Figure 9 is a sectional view taken on the line 9—9 of Figure 8;

Figure 10 is a sectional view showing the guide with the rotary power driven tool in a different position;

Figure 11 is a plan view of a modified tool guide;

Figure 12 is a side elevational view of the guide showing in Figure 11;

Figure 13 is a plan view of a further embodiment of this invention; and

Figure 14 is a side elevational view of the construction shown in Figure 13.

Referring more in detail to the drawings, the numeral 10 indicates a rotary tool guide comprising a track 11, a carriage 12 supported on the track 11 and a plate or supporting member 13 for a rotary power driven tool 14. The track 11 comprises laterally spaced rails 15 tubular in cross section and connected together at opposite ends by tubular cross members 16.

As shown particularly in Figures 2 and 3 of the drawings, the track 11 extends between a pair of uprights 17 having the lower ends connected together by bars 18 spaced laterally from each other to provide a slot 19 therebetween. The uprights 17 are respectively pivotally connected to the rails 15 of the track 11 intermediate the ends of the track, and this is accomplished in the manner shown in Figure 5 of the drawings. In detail bushings 20 are respectively secured to the rails 15 intermediate the ends of the latter with the axes of the bushings aligned and extending perpendicular to the rails 15. The bushings 20 are welded or otherwise secured to the undersides of the respective rails 15, so that the top sides of the rails are unobstructed. A pin 21 is journalled in each bushing 20, and the outer end of the pin has a reduced threaded part 22 which projects through a vertically elongated slot 23 formed in the adjacent upright 17. Suitable washers 24 respectively bridge the slots 23 at the outer sides of the uprights 17, and are secured in place by nuts 25 threaded upon the extremities 22 of the pins 21. As shown particularly in Figure 6 of the drawings, the pins 21 have enlarged heads 27 adjacent the threaded parts 22, and the heads 27 have flats 28 at opposite sides. The flats 28 on the pins 21 respectively slidably engage the walls of the vertical slots 23 to thereby not only hold the pins 21 against rotation relative to the uprights 17, but to also guide vertical displacement of the track 11 relative to the uprights 17. The construction is such that the elevation of the track 11 may be varied by merely loosening the nuts 25 and raising or lowering the track relative to the uprights 17. When the desired elevation of the track 11 is obtained, the nuts 25 are again tightened to clamp the pins 21 in their selected adjusted positions. It also follows from the foregoing that the track 11 is supported intermediate its ends for vertical swinging movement, and this is advantageous for reasons to be presently described.

The carriage 12 comprises a rectangular frame made up of angle bars positioned with the flanges projecting inwardly relative to the frame at the bottom edges of the bars. As shown in Figure 2 of the drawings, the end angle bars of the carriage frame are indicated by the numeral 29, and the side angle bars are indicated by the numeral 30. The side angle bars 30 are respectively positioned at the inner sides of the rails 15. Suitable brackets 31 are respectively secured to the side bars 30 adjacent opposite ends of the latter and rollers 32 are journalled on the respective brackets in positions to have a rolling engagement with the top sides of the rails 15. Referring again to Figure 5 of the drawings, it will be noted that the rollers 32 are flanged at opposite ends to hold the rollers on the respective rails 15 against lateral displacement relative to the rails. In practice the rollers 32 on at least one side of the carriage 12 are supported for limited axial displacement relative to the carriage in order to compensate for any inaccuracy of the track 11.

As shown in Figure 7 of the drawings, the plate 13 extends between the end bars 29 of the carriage frame and the opposite ends of the plate 13 rest on the inwardly extending flanges of the bars 29 directly below retaining members 33. The retaining members 33 are respectively positioned at the inner sides of the end bars 39 and are secured in lateral spaced relationship to the end members 39 by fastener elements 34.

A latch member 35 is supported for vertical sliding movement between each retaining member 33 and its associated end bar 29. As shown in Figure 8 the latch members are positioned intermediate the ends of the retainers 33, and are held in place by fastener elements 36 which extend through vertical slots 37 (Figure 7) and are anchored to the adjacent end bars. The length of the plate 13 is shown in Figure 7 as approximating the distance between the latch elements 35. The arrangement is such as to permit installation of the plate 13 when the latch elements 35 are in their raised positions indicated by the broken lines in Figure 7 of the drawings. After the plate 13 is positioned on the flanges of the end bars 29, the plate is adjusted endwise to a position wherein the latch members 35 may be moved downwardly adjacent opposite ends of the plate 13. Thus the plate 13 is firmly held on the carriage 12 against vertical displacement.

Lateral shifting of the plate 13 relative to the carriage is prevented by two pairs of clamping members respectively positioned at opposite ends of the plate 13. As shown particularly in Figure 2 of the drawings, each pair of clamping members comprises two parts 38 respectively slidably supported in the space provided between one of the retainers 33 and the adjacent end bar 29 at opposite sides of the latch 35. The outer ends of the parts 38 are turned inwardly to form flanges 39, which respectively engage opposite sides of the adjacent end of the plate 13. The parts 38 are each formed with a slot 40 (Figure 8) which extends lengthwise of the end bars 29 and through which the fastener elements 34 project. The above construction is such that the parts 38 of each pair of clamping members are adjustable as a unit lengthwise of the end frame bars and are also adjustable relative to each other. Hence the location of the plate 13 relative to the carriage may be varied to suit different conditions and plates of different widths may be accommodated.

The power operated rotary tool 14 is secured to the plate 13 by a bracket 41 (Figs. 2 and 3) in such a position that the plane of rotation of the tool extends parallel to the path of travel of the carriage 12 along the track 11. For the purpose of illustrating the present invention the power driven rotary tool 14 is shown as being in the form of a portable power driven hand operated saw. There are numerous different types of portable saws available to the trade, and any one of these types may be secured to the plate 13. Due to the fact that the tool 14 may be of conventional design, it is not described or illustrated in detail, and it will suffice to point out that this tool has a motor connected to a circular saw 43.

For reasons to be presently described, it is also desirable to support the tool 14 on the carriage 12 in a position such that the saw or tool 43 rotates in a plane perpendicular to the path of travel of the carriage 12 on the track 11. In order to accomplish this result the rectangular frame of the carriage is preferably square, and fastening means 44 for the plate 13 are respectively supported on the side bars 30. The fastening means 44 are shown herein as identical to the fastening means provided on the end bars 29 and corresponding parts are indicated by the same reference numerals.

Referring now to Figure 1 of the drawings, the guide 10 is shown as mounted on a bench or table 50 having a work supporting part 51 and having an outrigger 52. The outrigger 52 comprises two members 53, 53 which extend rearwardly beyond the bench 50 and are spaced laterally from each other (Figure 2) to provide a slot 54 which extends parallel to the track 11 substantially midway between the rails 15. In use the cross bars 18 rest on the top surface of the outrigger 52 at the rear side of the work supporting part 51, and are secured in place by a clamp 55. The clamp 55 comprises a vertical stud 56, which extends downwardly through the slot 19 intermediate the ends of the cross bars 18, and also projects through the slot 54 in the outrigger 52. A nut 57 is threaded on the lower end of the stud 56, and has a bearing part 58 positioned to engage the underside of the outrigger. A suitable handle 59 is welded to the nut 57 in order to facilitate operation of the nut to selectively clamp the cross bars 18 to and release the same from the outrigger 52. The construction is such that the uprights 17, together with the track 11 and carriage 12 may be swung to different angular positions about the vertical axis of the stud 56, and may also be moved in the direction of length of the track relative to the bench toward and away from a work positioning fence 60 on the bench 50.

Assuming that it is desired to cut across a work piece 61, the latter is supported on the bench 50 with the front edge abutting the fence 60. The guide 10 is then positioned on the outrigger 52 in the manner shown in Figure 1, and before the clamp 55 is tightened, the uprights 17 are moved into abutting engagement with the rear edge of the bench 51 so that the guide is squared relative to the work 61. The clamp 55 is then tightened to secure the guide in place, and the track 11 is properly adjusted vertically with respect to the uprights 17 to enable the rails 15 to rest on the top face of the work. After the elevation of the track is determined, the nuts 25 are tightened to secure the track in position relative to the uprights 17. It has been pointed out above that the guide may be adjusted lengthwise of the track along the outrigger 52, and the purpose of this adjustment is to permit work pieces 61 of different width to be accommodated between the fence 60 and the uprights 17. In the event the width of the work exceeds the corresponding dimension of the support 51, a suitable filler block (not shown) may be inserted between the uprights and the adjacent rear edge of the support 51.

In some instances it may be desired to cut the work piece 61 at a predetermined angle, and this may be accomplished by merely loosening the clamp 55 and swinging the guide about the axis of the vertical stud 56 to obtain the proper angle. In the event a plurality of cuts at the same angle are required, a filler block having the required angle may be introduced between the uprights 17 and the adjacent rear edge of the support 51.

Regardless of whether a straight or angle cross cut is desired, the carriage 12 is positioned at the rear of the track 11 at the start of the cutting operation. When in this position, the preponderance of weight of the carriage 12 and associated parts is applied to the track 11 at the rear side of the pivot pins 21 so that the track 11 assumes the broken line position shown in Figure 1. However as the carriage is moved toward the work, the weight is shifted to the front side of the pivot pins 21, and the track is swung downwardly in clamping engagement with the work 61 as indicated by the full line position of the track shown in Figure 1. Thus the work is held down against the bench by the weight of the carriage and tool 14 as the latter operates on the work. When the cut is completed the carriage 12 is returned to its rearwardmost position on the track, with the result that the track swings upwardly and releases the work.

In Figure 10 of the drawings the tool supporting plate 13 is mounted on the carriage 12 in a position extending at right angles to the position shown in Figure 1. Such a position of the work supporting plate 13 is rendered possible by the provision of the fastening means 44 on opposite side bars 30 of the carriage frame. When the plate 13 is located in the position shown in Figure 10, the saw or tool 43 rotates in a plane extending perpendicular to the path of travel of the carriage 12, and a fence 61 is provided between the uprights 17 and the adjacent rear edge of the work support 51 in order to accurately position the saw 43 relative to the work. The length of work is then fed along the support 51 in guiding relation to the fence 61, and is thereby ripped by the saw 43. When the guide is used for ripping purposes, the carriage 12 is secured in its proper adjusted position relative to the track 11 by a clamp 62 shown in Figure 4 of the drawings. The clamp 62 has an arcuate part 63 welded or otherwise secured at one end to one side bar 30 and extending over the adjacent rail 15 of the track 11. A thumb screw 64 is secured to the part 63 in a position to frictionally engage the adjacent rail 15 of the track. Thus it will be seen that the carriage may be adjusted lengthwise of the track 11 to rip the work to the specified dimension.

In some cases it may be preferred to rotate the saw 43 in the opposite direction to rip or cross cut the work. This may be readily accomplished by merely reversing the position of the plate 13 on the guide.

The embodiment of the invention shown in Figures 11 and 12 features a track 70 having rails 71 held in lateral spaced relationship by end members 72. The rails 71 comprise right angle bars having vertical flanges 73 and horizontal flanges 74 extending inwardly from the bottom edges of the flanges 74. The horizontal flanges 74 coact to slidably support a carriage 75 which in the present instance is the base plate of a portable power driven tool such as the saw 14 shown in Figure 1 of the drawing.

The track 70 is shown as pivoted intermediate the ends for vertical swinging movement and the construction of the pivotal support for the track 70 may be the same as described above in connection with the track 10. In any case the construction is such that movement of the base or carriage 75 along the track 70 from one side of the pivot axis to the other causes the track to swing about the pivot axis in a direction to clamp the work on the bench or in a direction to release the work; depending on the direction of movement of the carriage or base.

As shown in Figure 11, the base or carriage 75 has an opening 76 therethrough, and the front cross bar 72 of the track has a similar opening 77. When it is desired to use the saw 14 for ripping purposes the base or carriage is removed from the full line position in Figure 11 to the broken line position shown in the same figure. In the broken line position the base or carriage extends transversely of the track 70 and the opening 76 registers with the opening 77 so that a stud may be inserted therethrough. A suitable nut 78 may be threaded on the stud to securely clamp the base or carriage 75 in place on the track 70 and the desired ripping action may be obtained by merely feeding the work relative to the saw while the latter is fixed to the track. Work of varying widths may be accommodated by merely adjusting the track support relative to the bench which may be the same as the bench 50 previously described.

The modification shown in Figures 13 and 14 features a different construction of pivotal support for the track. The track shown in Figures 13 and 14 is generally the same as the track 70, and the same reference numerals are used to designate corresponding parts. Secured in any suitable manner to the vertical flange 73 of one track rail 71 intermediate the ends of the latter is a pivot pin 79 having its axis extending horizontally in perpendicular relation to the track 70. The pivot pin 79 is journaled in bearings 80 spaced from each other axially of the pin 79 and secured to a clamp 81. The clamp 81 is rotatably and slidably supported on a vertical post 82 having a clamp 83 at the lower end for securing the post to the work bench. Thus the track 70 may be adjusted vertically relative to the post to vary the elevation of the track, and may also be adjusted about the axis of the post to permit changing the angular relationship between the track 70 and work.

It is important to note that in each of the several embodiments of the invention selected herein for the purpose of illustration provision is made for sliding the work performing tool or saw across the axis of pivotal movement of the track for the tool. More particularly movement of the tool in one direction across the pivot axis of the track swings the latter downwardly into engagement with the work so that the work is firmly clamped against the bench during the sawing operation with little effort on the part of the user. Return movement of the tool to a position wherein the preponderance of weight is disposed on the opposite side of the pivot axis of the track raises the latter and releases the work.

What I claim as my invention is:

1. A guide for rotary power driven tools comprising laterally spaced uprights, a track extending between said uprights and having laterally spaced rails, means pivotally supporting said track intermediate the ends of said rails on said uprights for vertical swinging movement about an axis extending transversely of said track, said means comprising pivot pins extending transversely of said track and vertical slots in said uprights respectively slidably receiving said pins, clamping means for securing said pins in selected positions of vertical adjustment relative to said slots, bushings on said rails respectively sleeved over said pins for rotation thereon, a carriage supported on said rails for movement lengthwise thereof from one side of said axis to the other, and means on said carriage for supporting a rotary tool.

2. A guide for rotary power driven tools comprising a track having laterally spaced rails, a carriage supported on the rails for movement lengthwise of the rails, said carriage comprising a rectangular frame having a pair of side bars respectively positioned adjacent the rails and having a pair of end bars respectively connecting the ends of the side bars, a support for a power driven rotary tool, means respectively supported on the bars on one pair for removably securing the support on the carriage frame, said one pair of bars being in the form of angle members having vertical flanges and inwardly directed horizontal flanges, said securing means comprising retainers respectively secured to said angle members in spaced relation above said horizontal flanges, said support being dimensioned to extend between but terminate short of said vertical flanges in underlying relation to said retainers, and locking parts respectively insertable between said vertical flanges and adjacent ends of said support.

3. The guide defined in claim 2 in which said retainers are spaced inwardly from said vertical flanges, in which said locking parts are insertable into the spaces between said retainers and vertical flanges, and having means for clamping said locking parts to said one pair of bars in their inserted positions.

4. The guide defined in claim 3 in which each securing means includes a pair of members for limiting movement of said support lengthwise of said one pair of bars, and means for individually clamping said limiting members to the respective bars of said one pair in selected positions of adjustment lengthwise of said one pair of bars.

5. A guide for rotary power driven tools comprising laterally spaced uprights, a track extending between said uprights and having laterally spaced rails, means pivotally supporting said track intermediate the ends of said rails for vertical swinging movement about an axis extending transversely of said track, said means comprising pivot parts extending transversely of said track and vertical slots in said uprights respectively slidably receiving said pivot parts, clamping means for securing said pivot parts in selected positions of vertical adjustment relative to said slots, said rails having portions respectively rotatably supported on said pivot parts, a carriage supported on said rails for movement lengthwise thereof from one side of said axis to the other, and means on said carriage for supporting a rotary tool.

(References on following page)

References Cited in the file of this patent

UNITED STATES PATENTS

| | | |
|---|---|---|
| 1,815,037 | De Walt | July 21, 1931 |
| 1,842,630 | Rodning | Jan. 26, 1932 |
| 1,865,759 | Hughes | July 5, 1932 |
| 2,146,202 | Davenport | Feb. 7, 1939 |
| 2,502,640 | Coleman | Apr. 4, 1950 |
| 2,513,497 | Laughlin | July 4, 1950 |
| 2,527,754 | McDermett | Oct. 31, 1950 |
| 2,556,137 | Emmons | June 5, 1951 |
| 2,558,217 | Hess et al. | June 26, 1951 |
| 2,596,524 | Bridwell | May 13, 1952 |
| 2,627,287 | McCluskey | Feb. 3, 1953 |
| 2,629,410 | Cadwell | Feb. 24, 1953 |
| 2,630,146 | Van Tuyl | Mar. 3, 1953 |